(12) United States Patent
Akutagawa et al.

(10) Patent No.: US 9,716,568 B2
(45) Date of Patent: Jul. 25, 2017

(54) WIRELESS COMMUNICATION SYSTEM AND TRANSMITTER

(71) Applicant: Hitachi Kokusai Electric Inc., Tokyo (JP)

(72) Inventors: Hiroyuki Akutagawa, Tokyo (JP); Takehiko Kobayashi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 15/022,524

(22) PCT Filed: Sep. 26, 2013

(86) PCT No.: PCT/JP2013/076124
§ 371 (c)(1),
(2) Date: Mar. 16, 2016

(87) PCT Pub. No.: WO2015/045072
PCT Pub. Date: Apr. 2, 2015

(65) Prior Publication Data
US 2016/0233984 A1 Aug. 11, 2016

(51) Int. Cl.
*H04L 1/06* (2006.01)
*H04B 1/00* (2006.01)
(Continued)

(52) U.S. Cl.
CPC .............. *H04L 1/0618* (2013.01); *H04B 1/04* (2013.01); *H04B 1/06* (2013.01); *H04B 3/00* (2013.01); *H04B 7/02* (2013.01); *H04B 1/00* (2013.01)

(58) Field of Classification Search
CPC .... H04B 3/00; H04B 1/00; H04B 7/02; H04L 1/0618
See application file for complete search history.

(56) References Cited

U.S. PATENT DOCUMENTS 8,218,663 B2 * 7/2012 Muharemovic ..... H04L 27/2613
375/260
8,908,793 B2 * 12/2014 Han ..................... H04L 5/0007
375/295

(Continued)

FOREIGN PATENT DOCUMENTS

JP 2012-15682 A 1/2012
JP 2012-134729 A 7/2012
JP 2013-21497 A 1/2013

OTHER PUBLICATIONS

International Search Report from International Application No. PCT/JP2013/076124 mailed Dec. 17, 2013.
(Continued)

*Primary Examiner* — Jean B Corrielus
(74) *Attorney, Agent, or Firm* — Brundidge & Stanger, P.C.

(57) ABSTRACT

The present invention relates to a radio communication system that provides a transmission technique capable of suppressing degradation of communication quality even in an area other than an interference area of two base station radio waves. Further, the transmission technique and the communication system include implementation of a Differential Space-Time Block Coding (DSTBC) method relating to transmission diversity in radio communication utilizing, for example, base stations with transmission antennas that transmit respective sequence signals of the DSTBC.

11 Claims, 5 Drawing Sheets

(51) Int. Cl.
*H04B 7/02* (2017.01)
*H04B 3/00* (2006.01)
*H04B 1/04* (2006.01)
*H04B 1/06* (2006.01)

(56) References Cited

U.S. PATENT DOCUMENTS

| | | | | |
|---|---|---|---|---|
| 8,982,997 | B2* | 3/2015 | Jia | H04B 7/0667 |
| | | | | 332/106 |
| 9,112,689 | B2* | 8/2015 | Papasakellariou | H04L 1/1607 |
| 9,154,212 | B2* | 10/2015 | Kato | H04B 7/0697 |
| 9,166,663 | B2* | 10/2015 | Bayesteh | H04B 7/0473 |
| 2003/0086479 | A1* | 5/2003 | Naguib | H04B 1/71072 |
| | | | | 375/144 |
| 2006/0182199 | A1* | 8/2006 | Hong | H04L 1/0003 |
| | | | | 375/299 |
| 2009/0225809 | A1* | 9/2009 | Abou Rjeily | H04B 1/71635 |
| | | | | 375/130 |
| 2012/0099668 | A1* | 4/2012 | Sakata | H04B 7/0613 |
| | | | | 375/267 |

OTHER PUBLICATIONS

T. Taniguchi, et al., Performance Improvement of DSTBC SystemsUsing Decision on Feedback Approach, The Third International Conference on Systems and Networks Communications, Oct. 2008, pp. 115-120.

\* cited by examiner

WIRELESS COMMUNICATION SYSTEM AND TRANSMITTER

BACKGROUND

Technical Field

The present invention relates to a transmission technique and a communication system including implementation of a Differential Space-Time Block Coding (DSTBC) method relating to transmission diversity in radio communication.

Related Art

One means for improving the reception quality of a mobile station during communication with the mobile unit includes a transmission diversity method using Space-Time Block Coding (STBC). The STBC can implement transmission diversity in a transmitter without using CSI (Channel State Information). Therefore, the STBC is effective under a fading environment, but requires the CSI at the receiver side.

The CSI is an element given to a signal when the radio signal propagates through space, and when a change in the CSI is small, the CSI can be estimated at a reception side by using a training signal. However, in a communication system having a narrow transmission frequency bandwidth and moving at a high speed, the parameter of the CSI changes while training is performed. Therefore, this issue is a significant problem.

Therefore, the DSTBC method that does not require the CSI in a transmitter and a receiver has been suggested by Tarokh et al. In the DSTBC method, the CSI is not required at the receiver either. Therefore, the DSTBC method is effective even under a fast fading environment that cannot be tracked with the STBC.

For example, a train radio system including multiple base stations provided along a railway track and simultaneously transmitting signals using a same frequency so that a single radio area is structured, and multiple vehicle stations receiving the signals in a broadcast manner. In this train radio system, at around the middle point of two adjacent base stations, two identical signals arriving from opposite directions interfere with each other at about the same power so that a standing wave is formed which may greatly degrade the communication quality. This phenomenon is called identical wave interference.

Therefore, an application of a DSTBC method has been suggested (JP 2012-015682 A) as a countermeasure against the identical wave interference in train radio systems. This employs the DSTBC method for the downlink of radio communication between a base station and a mobile station (i.e., the base station to the mobile station), and two orthogonal code sequences (hereinafter referred to as a sequence A and a sequence B) are generated and used. This is a method, in which a base station transmitting only the sequence A and a base station transmitting only the sequence B are arranged alternately, so that even at around the middle point between two base stations, the incoming waves from the two base stations do not interfere with each other, and on the contrary, transmission diversity effect can be obtained, and the communication quality can be improved. This will be explained with reference to FIG. 7.

Figure 7:
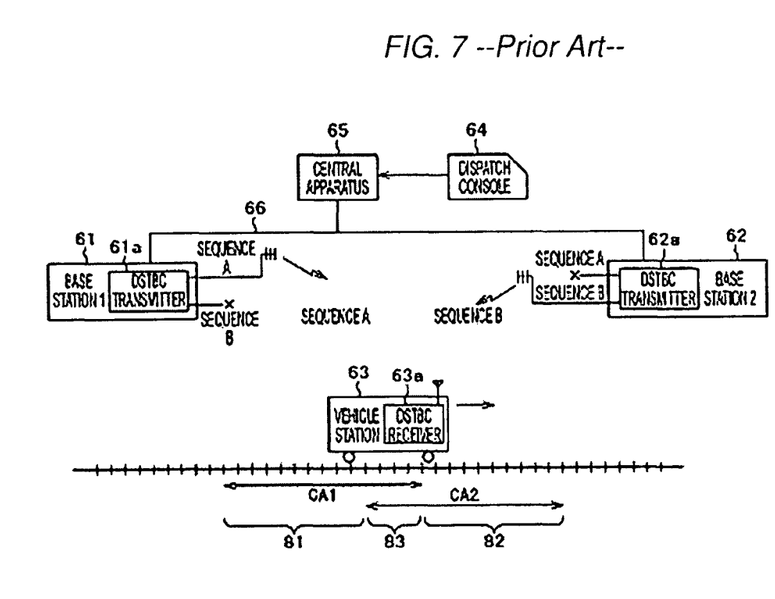
FIG. 7 is a configuration diagram illustrating a train radio system according to background art.

FIG. 7 is an example case of train radio systems, and the following explanation is focused on the downlink. In order to simplify the explanation, a system constituted by two base stations is used in this model.

A train radio system of FIG. 7 includes a dispatch console 64, a central apparatus 65, a base station 61, a base station 62, and a vehicle station 63. The dispatch console 64 performs control of the central apparatus 65. For example, a wire circuit 66 such as an optical fiber connects between the central apparatus 65 and base stations 61 and 62. A radio circuit of the same frequency connects between the base station 61 and the vehicle station 63 and between the base station 62 and the vehicle station 63. Therefore, a broadcast call with audio can be made between the dispatch console 64 and the vehicle station 63.

It should be noted that the radio area in the model case of FIG. 7 is structured as follows.

More specifically, the transmission radio wave from the base station 61 covers the range of a coverage area CA1 of FIG. 7, and the transmission radio wave from the base station 62 covers the range of a coverage area CA2 of FIG. 7. The coverage areas CA1 and CA2 overlap each other at around the border between the coverage areas CA1 and CA2 in order to eliminate blind zone. As a result, the following areas exist: an area 81 in which the radio wave of the base station 61 can be received at a certain level or higher, an area 82 in which the radio wave of the base station 62 can be received at a certain level or higher, and an area 83 in which the radio waves of both of the base stations 61 and 62 can be received at a certain level or higher.

The train radio system of FIG. 7 is a system to which the DSTBC coding method is applied in order to cope with identical wave interference that occurs in the area 83. More specifically, the base station 61 having a DSTBC code transmitter 61a provided therein transmits only the sequence A of DSTBC, which covers the coverage area CA1. Likewise, the base station 62 having a DSTBC code transmitter 62a provided therein transmits only the sequence B of DSTBC, which covers the coverage area CA2. The vehicle station 63 has a DSTBC decoding receiver 63a provided therein, and communicates by receiving and decoding radio waves arriving from the base station 61 and the base station 62.

In this case, a generally available DSTBC decoding receiver has the following features.

The feature 1 is that even if the receiver receives only the sequence A (area 81 in FIG. 7), or only the sequence B (area 82 in FIG. 7), or the composite wave of the sequence A and the sequence B (area 83 in FIG. 7), the receiver is able to decode all of them with the same circuit configuration.

The feature 2 is that when the receiver receives the composite wave of the sequence A and the sequence B, e.g., in the area 83, the receiver can obtain the effect of transmission diversity regardless of the phase relationship of both of them.

Because of the above features, the example case of FIG. 7 can be said to be an effective method as a countermeasure against the identical wave interference.

However, as a method for coping with the identical wave interference, the system of FIG. 7 employs a method of transmitting only one of the sequences of DSTBC from a single base station. In this method, there would no problem in the interference area (area 83) of the two base station radio waves, but there is a problem in that, in an area where the receiver receives only one of the two sequences or in an area where one of the electric field strengths is significantly low (the areas 81 and 82), the communication quantity is slightly degraded as compared with the case where the DSTBC is not applied.

SUMMARY

It is an objective of the present invention to provide a DSTBC transmission technique capable of suppressing degradation of the communication quality even in an area other than an interference area of two base station radio waves.

In order to solve the above problems, an example configuration of a radio communication system is as follows:

a radio communication system including a first transmitter, a second transmitter, and a receiver, wherein the first transmitter includes:

a first symbol mapping unit for outputting first and second transmission basic symbols by performing symbol modulation of a first bit string, a first differential time-space coding unit for being given a first initial value, receiving the first and second transmission basic symbols and performing differential time-space coding processing, and generating a sequence A code and a sequence B code, which are orthogonal to each other, a first transmission unit for modulating the sequence A code and the sequence B code with a radio frequency, and outputting the sequence A code and the sequence B code as a sequence A transmission signal and a sequence B transmission signal, respectively, a first antenna for outputting the sequence A transmission signal with a radio signal, and a second antenna for outputting the sequence B transmission signal with a radio signal;

wherein the second transmitter includes:

a second symbol mapping unit for outputting the first and second transmission basic symbols by performing symbol modulation of the first bit string, a second differential time-space coding unit for being given a second initial value different from the first initial value, receiving the first and second transmission basic symbols and performing the differential time-space coding processing, and generating a sequence C code, which is different from the sequence A code, and a sequence D code, which is different from the sequence B code, the sequence C code and the sequence D code are orthogonal to each other, a second transmission unit for modulating the sequence C code and the sequence D code with a radio frequency, and outputting the sequence C code and the sequence D code as a sequence C transmission signal and a sequence D transmission signal, a third antenna for outputting the sequence C transmission signal with a radio signal, and a fourth antenna for outputting the sequence D transmission signal with a radio signal; and wherein the receiver includes:

a reception unit for receiving and modulating the sequence A transmission signal, the sequence B transmission signal, the sequence C transmission signal, and the sequence D transmission signal, a differential time-space decoding unit for performing differential time-space decoding processing of an output signal given from the reception unit, and a symbol detection unit for restoring the first bit string on the basis of an output signal given from the differential time-space decoding unit.

With the above configuration, the degradation of the communication quality can be suppressed even in an area other than an interference area of two base station radio waves.

DETAILED DESCRIPTION

An embodiment of the present invention will be explained with reference to the drawings.

Figure 1:
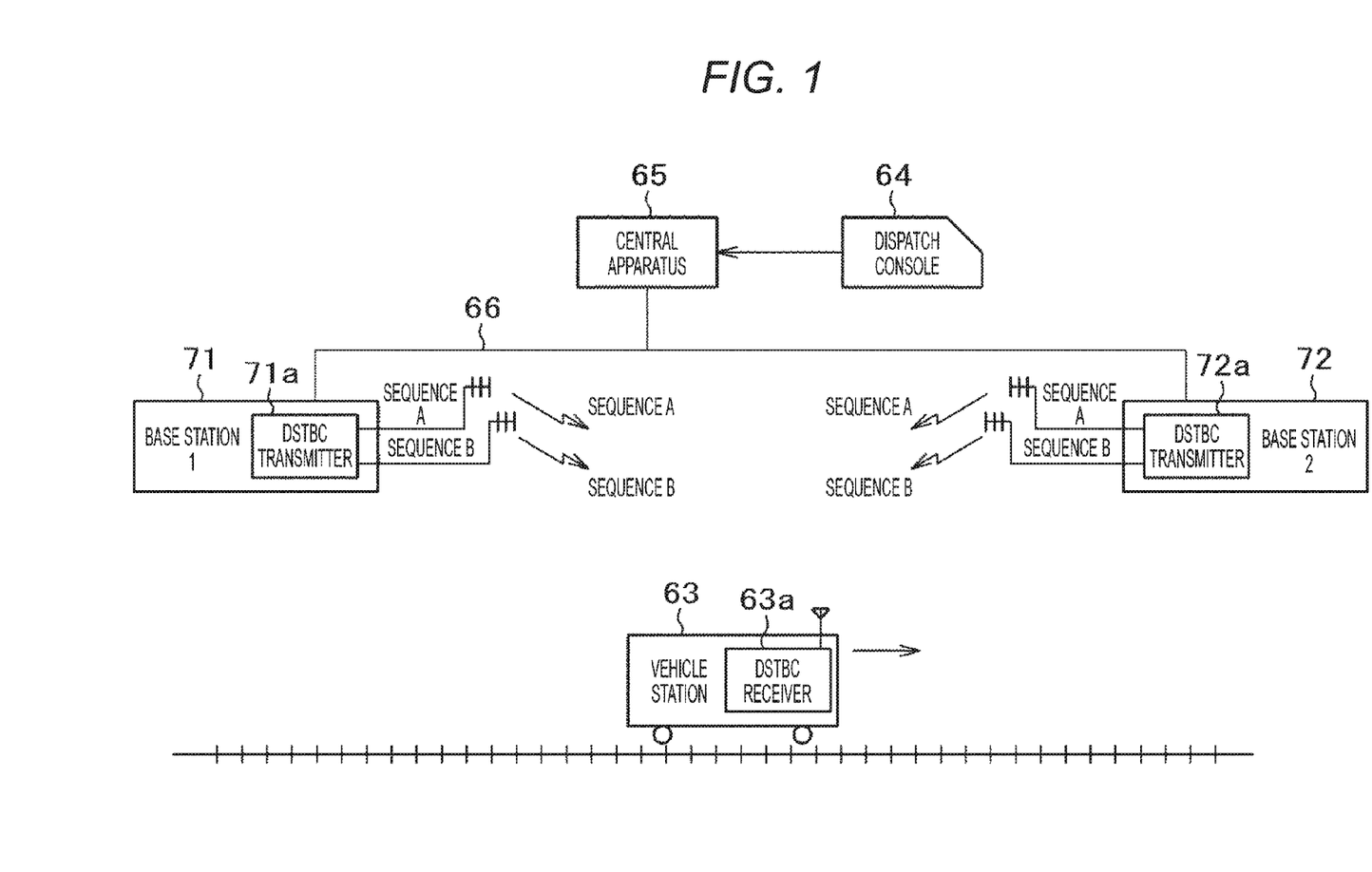
FIG. 1 is a configuration diagram illustrating a train radio system according to an embodiment of the present invention.

First, a configuration of a train radio system according to an embodiment of the present invention will be explained with reference to FIG. 1. FIG. 1 is a configuration diagram illustrating the train radio system according to the embodiment of the present invention. The same elements as those in FIG. 7 are denoted as the same reference numerals as those of FIG. 7.

As shown in FIG. 1, each of the base station 71 and the base station 72 is provided with two transmission antennas, and these two antennas transmit a sequence A signal and a sequence B signal of DSTBC. More specifically, DSTBC transmitters 71a and 72a of the two base stations 71 and 72 transmit two sequences of the sequence A signal and the sequence B signal, respectively, which are orthogonal to each other. In addition, the present embodiment is configured so that the sequence A signals transmitted from the base station 71 and the base station 72 are different from each other, and the sequence B signals transmitted from the base station 71 and the base station 72 are different from each other.

As described above, in the present embodiment, the base stations are provided with two transmission antennas, the base stations employ the transmission diversity configuration, and the base stations simultaneously transmit signals of two sequences of DSTBC which are orthogonal to each other. At this occasion, the signals of two sequences transmitted from base stations adjacent to each other are configured to be different from each other.

In order to simplify the explanation, the system is constituted by two base stations in FIG. 1, but the system may be constituted by three or more base stations.

Figure 2:
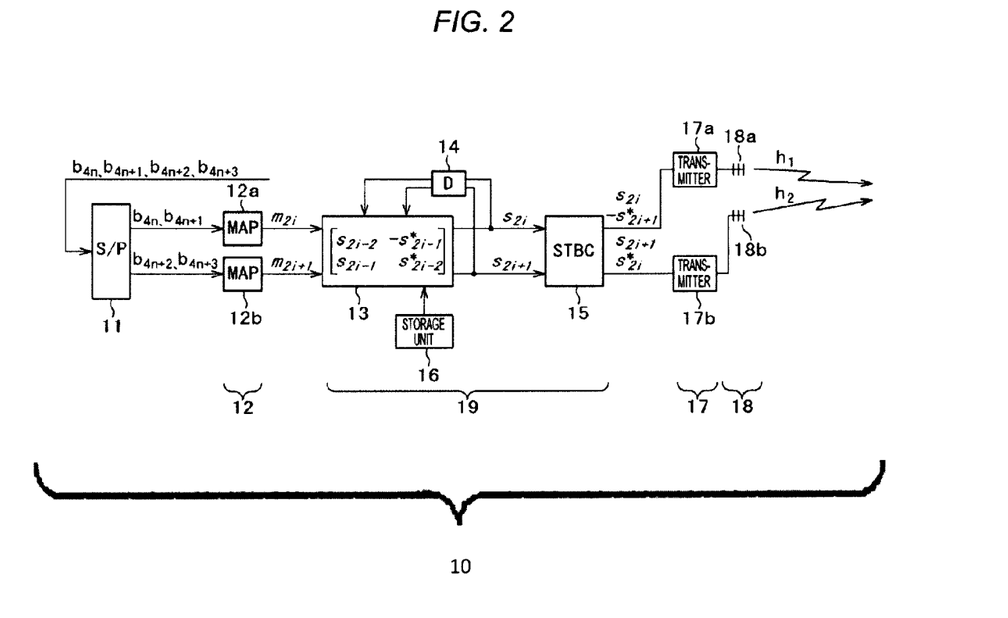
FIG. 2 is a configuration diagram illustrating a DSTBC transmitter according to an embodiment of the present invention.
Figure 3:
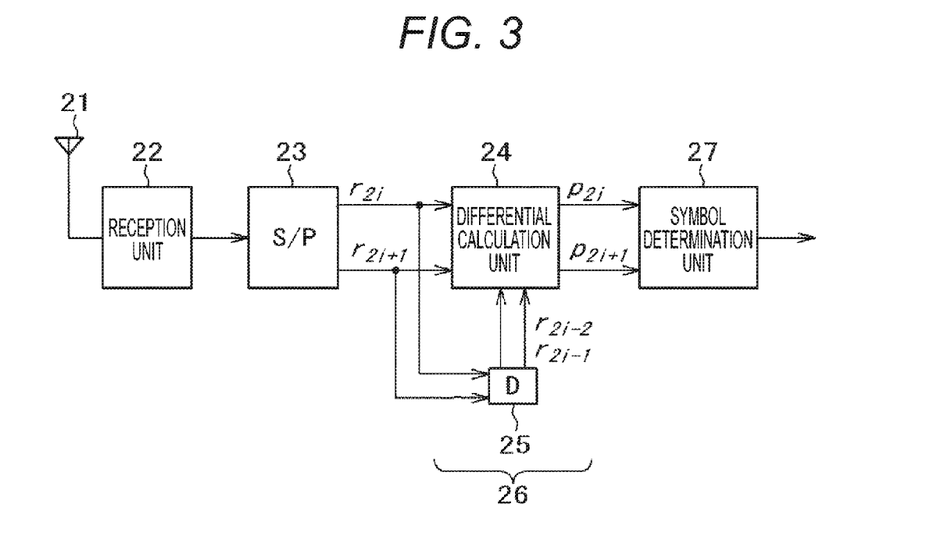
FIG. 3 is a configuration diagram illustrating a DSTBC receiver according to an embodiment of the present invention.

Subsequently, circuit configurations of a transmitter and a receiver of the DSTBC method will be explained with reference to FIGS. 2 and 3. FIG. 2 is a configuration diagram illustrating a DSTBC transmitter according to an embodiment of the present invention. FIG. 3 is a configuration diagram illustrating a DSTBC receiver according to an embodiment of the present invention.

First, the DSTBC transmitter 10 will be explained with reference to FIG. 2.

As shown in FIG. 2, the DSTBC transmitter 10 according to the present embodiment includes an S/P (serial-parallel) conversion unit 11, two symbol mapping units 12a and 12b, a differential calculation unit 13, a delay unit 14, a time-space coding unit (STBC coding unit) 15, a storage unit 16, two transmission units 17a and 17b, and two antennas 18a and 18b. The differential time-space coding unit (DSTBC coding unit) 19 includes a differential calculation unit 13, a delay unit 14, a time-space coding unit 15, and a storage unit 16.

Operation of the DSTBC transmitter 10 according to the present embodiment will be explained.

The S/P conversion unit 11 receives a serial signal of a bit string made by converting, e.g., an audio signal into a digital signal. The S/P conversion unit 11 divides the received serial signal into pairs of symbols, and outputs the pairs of symbols as parallel signals, to the symbol mapping units 12a and 12b with an interval of symbol timing. The symbol timing is timing with which information (symbol) is conveyed with a carrier wave at the transmission side.

Since the present embodiment uses four value digital modulation (2 bits/1 symbol), the S/P conversion unit 11 divides four bits input signal ($b_{4n}$, $b_{4n+1}$, $b_{4n+2}$, $b_{4n+3}$) into pairs of bits, i.e., ($b_{4n}$, $b_{4n+1}$) and ($b_{4n+2}$, $b_{4n+3}$), and, for example, the S/P conversion unit 11 outputs ($b_{4n}$, $b_{4n+1}$) to the symbol mapping unit 12a in the first symbol timing, and outputs ($b_{4n+2}$, $b_{4n+3}$) to the symbol mapping unit 12b in the subsequent symbol timing. In this example, n (n=0, 1, 2, . . . ) is a sequence number that changes with every four bits.

For example, a modulation method called phase modulation (QPSK: Quadrature Phase Shift Keying) can be used as the symbol modulation of four value digital modulation (2 bits/1 symbol).

When the symbol mapping units 12a, 12b receive bit strings ($b_{4n}$, $b_{4n+1}$), ($b_{4n+2}$, $b_{4n+3}$), respectively, from the S/P conversion unit 11, the symbol mapping units 12a, 12b perform mapping in accordance with symbol modulation designated in advance, and output the result thereof to the differential calculation unit 13 as a transmission basic symbol which serves as a basis for a transmission symbol.

More specifically, for the bit string for two symbols divided by the S/P conversion unit 11, the symbol mapping unit 12a maps the input bit string ($b_{4n}$, $b_{4n+1}$) to values of the IQ plane and outputs a symbol modulation result $m_{2i}$. On the other hand, the symbol mapping unit 12b maps the input bit string ($b_{4n+2}$, $b_{4n+3}$) to values of the IQ plane, and outputs a symbol modulation result $m_{2i+1}$.

As described above, the symbol mapping unit 12 of the transmitter 10 is constituted by the symbol mapping unit 12a and the symbol mapping unit 12b. The symbol mapping unit 12 performs symbol modulation to modulate the bit string that is input into the transmitter 10, and outputs a first transmission basic symbol $m_{2i}$ and a second transmission basic symbol $m_{2i+1}$.

As described above, the input of the differential calculation unit 13 is a vector $[m_{2i}\ m_{2i+1}]^T$, and is a transmission basic symbol (complex number) modulated by the symbol mapping units 12a and 12b on the basis of the digital bit to be transmitted. In this example, T represents transposition. The subscripts i (i=0, 1, 2, . . . ) representing the time sequence is a number increased with every two symbols, and $i \geq 0$ is satisfied. It should be noted that i=0 represents the head of the radio frames to be transmitted, and this number is reset to zero at the head of the radio frames.

After the differential calculation unit 13 receives the symbol modulation results $m_{2i}$ and $m_{2i+1}$, the differential calculation unit 13 calculates Expression 1, and outputs $s_{2i}$, $s_{2i+1}$, which is the result thereof, to the delay unit 14 and the time-space coding unit (STBC coding unit) 15. In Expression 1, calculation is performed by using the inputs $m_{2i}$ and $m_{2i+1}$ and the outputs $s_{2i-2}$ and $s_{2i-1}$ of the delay unit 14, i.e., the previous outputs $s_{2i-2}$, $s_{2i-1}$ of the differential calculation unit 13. As a result, calculation results $s_{2i}$, $s_{2i+1}$ are outputted. In this example, in Expression 1, "*" denotes a conjugate complex number.

When the differential calculation unit 13 calculates Expression 1, $s_{-2}$ and $s_{-1}$, which are initial values of $s_{2i}$ and $s_{2i+1}$, are retrieved from the storage unit 16.

[Mathematical Formula 1]

$$\begin{bmatrix} s_{2i} \\ s_{2i+1} \end{bmatrix} = \begin{bmatrix} s_{2i-2} & -s^*_{2i-1} \\ s_{2i-1} & s^*_{2i-2} \end{bmatrix} \begin{bmatrix} m_{2i} \\ m_{2i+1} \end{bmatrix} \quad \text{(Expression 1)}$$

As described above, the output symbol of the differential calculation unit 13 is a result of recursive matrix calculation based on Expression 1 by using the previous output, i.e., the output value of Expression 1 itself in the past by two symbol times. In this example, the symbol time is a time interval which symbols are transmitted from the transmission units 17a, 17b. It should be noted that the calculation of the differential calculation unit 13 is not limited to the calculation based on Expression 1, as long as it is recursive matrix calculation using a previous result.

The delay unit 14 delays $s_{2i}$ and $s_{2i+1}$ received from the differential calculation unit 13, and outputs $s_{2i}$ and $s_{2i+1}$ to the differential calculation unit 13 so as to allow the differential calculation unit 13 to calculate Expression 1.

The storage unit 16 stores the initial values $s_{-2}$ and $s_{-1}$. The initial values $s_{-2}$ and $s_{-1}$ may be set to any values that satisfy Expression 6 explained below. For example, the initial values $s_{-2}$ and $s_{-1}$ are input by an operator with an operation unit (not shown) of the transmitter 10, and are stored to the storage unit 16 in advance.

The time-space coding unit 15 receives $[s_{2i}, s_{2i+1}]^T$ which is an output vector of the differential calculation unit 13, and performs publicly-known time-space coding processing, and as a result, the time-space coding unit 15 generates a sequence A signal and a sequence B signal, and outputs the sequence A signal and the sequence B signal to the transmission units 17a and 17b over two symbol times. More specifically, as the output of the sequence A signal, the time-space coding unit 15 outputs $s_{2i}$ to the transmission unit 17a with the timing of the symbol number 2i, and outputs $-s^*_{2i+1}$ to the transmission unit 17a at the time of the symbol number 2i+1. As the output of the sequence B signal, the time-space coding unit 15 outputs $s_{2i+1}$ to the transmission unit 17b with the timing of the symbol number 2i, and outputs $s^*_{2i}$ to the transmission unit 17b at the time of the symbol number 2i+1. As described above, the time-space coding unit 15 generates signal sequences obtained by interchanging each element of the input vector $[s_{2i}, s_{2i+1}]^T$ in terms of time and space, and outputs the generated signal sequences.

The transmission unit 17a performs D/A (Digital to Analog) conversion processing and orthogonal modulation processing on the output from the time-space coding unit 15, and thereafter, the transmission unit 17a modulates the signal with a desired radio transmission frequency, amplifies the signal, and outputs the amplified signal to the antenna 18a. The transmission unit 17b also performs the same processing as that of the transmission unit 17a. The transmission unit 17 of the transmitter 10 includes the transmission unit 17a and the transmission unit 17b. As described above, the output of the transmission unit 17 (the transmission unit 17a and the transmission unit 17b) is such that the output signals from the transmission unit 17a and the transmission unit 17b are at the same frequency as each other and have the orthogonal property.

The antenna 18a outputs, with a radio signal, the output signal from the transmission unit 17a. The antenna 18b outputs, with a radio signal, the output signal from the transmission unit 17b. In the present embodiment, the antenna 18a and the antenna 18b are omnidirectional. Alternatively, the antenna 18a and the antenna 18b may be given directionality to be configured to transmit in a predetermined direction, e.g., in a direction of an opposing base station. The antenna 18 of the transmitter 10 includes the antenna 18a and the antenna 18b.

In this manner, the output $(s_{2i}, -s^*_{2i+1})$ of the sequence A is transmitted from the antenna 18a over two symbol times, and the output $(s_{2i+1}, s^*_{2i})$ of the sequence B orthogonal to the sequence A is transmitted from the antenna 18b over two symbol times.

As described above, the DSTBC transmitter 10 generates the sequence A signal $(s_{2i}, -s^*_{2i+1})$ and the sequence B signal $(s_{2i+1}, s^*_{2i})$ from a single signal sequence $(s_{2i}, s_{2i+1})$, and transmits the sequence A signal and the sequence B signal from the antennas. The reception side performs demodulation calculation of the received sequence A signal and the received sequence B signal, thus obtaining diversity effect in terms of time and space.

Subsequently, the receiver 20 will be explained with reference to FIG. 3.

The DSTBC receiver 20 includes a reception antenna 21, a reception unit 22, an S/P (serial-parallel) conversion unit 23, a differential calculation unit 24, a delay unit 25, and a symbol detection unit 27. The differential time-space decoding unit (DSTBC decoding unit) 26 includes a differential calculation unit 24 and a delay unit 25.

In the digital radio communication, the receiver has a configuration of reception diversity in a typical example. However, for the sake of simplifying the explanation, the DSTBC receiver 20 is configured as single reception in the present specification.

When the reception unit 22 receives a signal transmitted from the transmitter 10 with the reception antenna 21, the reception unit 22 performs processing such as amplification, frequency conversion, demodulation, A/D (Analog to Digital) conversion, and the like, and outputs the processed result to the S/P conversion unit 23.

The S/P conversion unit 23 performs parallel conversion to convert the serial signal received from the reception unit 22, and organizes and outputs every two symbols to the differential calculation unit 24 and the delay unit 25.

The delay unit 25 delays the signal received from the S/P conversion unit 23 by two symbol times and outputs the signal to the differential calculation unit 24 to allow the differential calculation unit 24 to perform calculation.

In this example, where CSIs of transmission paths extending from the transmission antennas 18a and 18b of the transmitter 10 to the reception antenna 21 are denoted as $h_1$ and $h_2$, respectively, the output of the reception signal of the reception unit 22, i.e., the output of the S/P conversion unit 23, is represented by Expression 2.

[Mathematical Formula 2]

$$\left. \begin{array}{l} r_{2i} = h_1 s_{2i} + h_2 s_{2i+1} \\ r_{2i+1} = -h_1 s^*_{2i+1} + h_2 s^*_{2i} \end{array} \right\} \quad \text{(Expression 2)}$$

In order to decode an original transmission basic symbol $[m_{2i}, m_{2i+1}]^T$ from this reception signal $(r_{2i}, r_{2i+1})$, the differential calculation unit 24 receives, from the delay unit 25, the reception signal $(r_{2i-2}, r_{2i-1})$ that is previously output from the S/P conversion unit 23 to the differential calculation unit 24 (a reception signal that is received in the past by two symbol times), and uses this to perform calculation represented by Expression 3 once in every two symbol times. Accordingly, the differential calculation unit 24 performs the decoding processing corresponding to the DSTBC coding performed by the transmitter 10, and outputs $[p_{2i}, p_{2i+1}]^T$, which is the processing result thereof, to the symbol detection unit 27.

[Mathematical Formula 3]

$$\begin{bmatrix} p_{2i} \\ p_{2i+1} \end{bmatrix} = \frac{1}{|r_{2i-2}|^2 + |r_{2i-1}|^2} \begin{bmatrix} r^*_{2i-2} & r_{2i-1} \\ r^*_{2i-1} & -r_{2i-2} \end{bmatrix} \begin{bmatrix} r_{2i} \\ r^*_{2i+1} \end{bmatrix} \quad \text{(Expression 3)}$$

In this example, a vector $[p_{2i}, p_{2i+1}]^T$, which is the output from the differential calculation unit 24, is equal to the transmission symbol vector $[m_{2i}, m_{2i+1}]^T$ under the condition where the noise component can be disregarded and the change of $h_1$ and $h_2$ over time is sufficiently low. Therefore, under the above condition, the bit string obtained by performing symbol detection on the component of the vector $[p_{2i}, p_{2i+1}]^T$ is output as the reception bit, so that the data of the bit string given to the transmitter 10 can be restored.

The symbol detection unit 27 performs symbol detection on the signal $[p_{2i}, p_{2i+1}]^T$ that is output from the differential calculation unit 24, and restores and outputs the data of the bit string on the basis of the determination result, i.e., estimates and outputs the data of the bit string that is given to and transmitted by the transmitter 10.

In this example, in order to maintain the power of the output signal of the DSTBC coding unit 19 of the transmitter 10 at a constant value, it is necessary that the Expression 4, which is the matrix in Expression 1, be a unitary matrix.

[Mathematical Formula 4]

$$\begin{bmatrix} s_{2i-2} & -s^*_{2i-1} \\ s_{2i-1} & s^*_{2i-2} \end{bmatrix} \quad \text{(Expression 4)}$$

The condition for the matrix of Expression 4 to be a unitary matrix is that the transmission basic symbol vector $[m_{2i}, m_{2i+1}]^T$ satisfies Expression 5 and the initial values $s_{-2}$ and $s_{-1}$ of Expression 1 satisfies Expression 6. More specifically, in an example where $[m_{2i}, m_{2i+1}]^T$ satisfies Expression 5 and the initial values $s_{-2}$ and $s_{-1}$ satisfy Expression 6, the relationship of $|s_{2i}|^2 + |s_{2i+1}|^2 = 1$ is satisfied with regard to the output of Expression 1.

[Mathematical Formula 5]

$$|m_{2i}|^2 + |m_{2i+1}|^2 = 1 \quad \text{(Expression 5)}$$

[Mathematical Formula 6]

$$|s_{-2}|^2 + |s_{-1}|^2 = 1 \quad \text{(Expression 6)}$$

In this example, it is confirmed that, depending how the initial values $s_{-2}$ and $s_{-1}$ satisfying Expression 6 are given, the output symbol $[s_{2i}, s_{2i+1}]^T$, $[-s^*_{2i+1}, s^*_{2i}]^T$ of the DSTBC coding unit 19 are different output symbols even when the input $[m_{2i}, m_{2i+1}]^T$ of the DSTBC coding unit 19 is the same. More specifically, it is confirmed that the temporal transition of the output of the DSTBC coding unit 19 obtained by repeating the calculation of Expression 1 with every two symbol transmission times is different according to the values of the initial values $s_{-2}$ and $s_{-1}$ given to the DSTBC coding unit 19. This is disclosed in International Application Publication WO 2011/105103 A1 and WO 2011/125329 A1.

It should be noted that the initial values $s_{-2}$ and $s_{-1}$ do not affect the circuit configuration of the receiver 20 as long as the condition of Expression 6 is satisfied. More specifically, as long as the condition of Expression 6 is satisfied, the receiver 20 can perform the DSTBC decoding processing without changing the circuit configuration thereof no matter what kind of values the initial values $s_{-2}$ and $s_{-1}$ are.

FIRST COMPARATIVE EXAMPLE

Hereinafter, the system of FIG. 7 described above will be explained as the first comparative example.

FIG. 2 is described to express a system of a single DSTBC transmitter, e.g., a transmitter 71a shown in FIG. 1, but FIG. 2 is a block diagram equivalent to two DSTBC transmitters 61a and 62a shown in FIG. 7 in that a sequence A and a sequence B are output from two different antennas. Therefore, a transmission and reception system diagram constituted by the two DSTBC transmitters as shown in FIG. 7 and the DSTBC receiver as shown in FIG. 3 can be expressed by a transmission and reception system diagram configured in FIGS. 2 and 3.

Figure 4A:
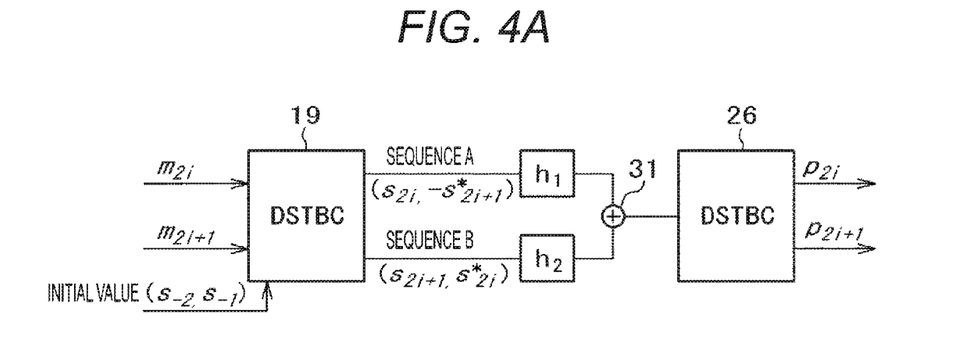
FIG. 4A is an equivalent system diagram illustrating a DSTBC transmission and reception system according to a first comparative example.

When the transmission and reception system diagram depicted in FIGS. 2 and 3 is simplified, it can be expressed as shown in a block diagram in FIG. 4A. FIG. 4A is a figure illustrating a transmission and reception system according to a first comparative example (a transmission and reception system constituted by the two DSTBC transmitters as shown in FIG. 7 and the DSTBC receiver as shown in FIG. 3). As shown in FIG. 4A, the signals of two systems, i.e., the sequence A and the sequence B generated by the DSTBC coding unit 19 are modulated with orthogonal modulation by a transmission unit (not shown), and thereafter, output from the transmitter 10. As the CSI of the transmission path, the sequence A signal is weighted by a weight $h_1$, and the sequence B signal is weighted by a weight $h_2$. When the radio waves of the sequence A signal and the sequence B signal are input into the receiver 20, they are combined in terms of radio wave, and thereafter, the combined radio wave is input into the DSTBC decoding unit 26. The adder 31 means "combining" in terms of radio wave.

Figure 4B:
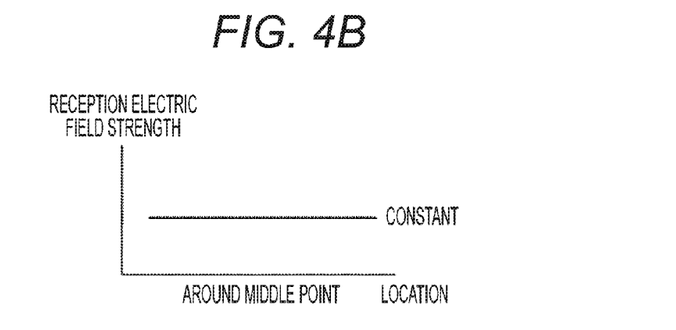
FIG. 4B is a figure illustrating average reception electric field according to the first comparative example.

FIG. 4B schematically illustrates an average reception electric field of the receiver 20 at around the middle point between the base station 61 and the base station 62 in the model diagram of FIG. 7. The horizontal axis of FIG. 4B represents a position and a range of several meters to several dozen meters at around the middle point. However, FIG. 4B shows an example of line-of-sight environment, i.e., an example of an environment where there is no physical obstacles between the two base stations. Therefore, FIG. 4B shows an example where $h_1$ and $h_2$ are substantially the same, i.e., an example where $|h1| \approx |h2|$ is satisfied.

The sequence A signal and the sequence B signal which are coded with DSTBC coding are transmitted from the transmitters 61a and 62a. Therefore, as shown in the image diagram of FIG. 4B, almost constant reception input can be ensured in a range of several dozen meters at around the middle point of two base stations regardless of the location. However, as described above, in the system of FIG. 7, there is a problem in that, as compared with the example where DSTBC is not applied, the communication quality is degraded in the area where only one of the sequences is received.

SECOND COMPARATIVE EXAMPLE

In order to solve the problem associated with the first comparative example, a method (second comparative example) may be considered, in which two transmission antennas are prepared for each of the base stations, and each of the base stations employ transmission diversity configuration, so that each of the base stations simultaneously transmit signals of two sequences according to DSTBC. In this second comparative example, however, the sequence A signals transmitted from the base station 71 and the base station 72 are the same as each other, and the sequence B signals transmitted from the base station 71 and the base station 72 are the same as each other.

Since the second comparative example is the same as the present embodiment in that all the base stations simultaneously transmit two sequences of DSTBC, the second comparative example can be expressed by the model diagram of FIG. 1. More specifically, FIG. 1 is a configuration diagram illustrating a train radio system according to the present embodiment, and is also a configuration diagram illustrating a train radio system according to the second comparative example.

Only the difference from the model of FIG. 7 will be explained. In the second comparative example, each of the base station 71 and the base station 72 has two transmission antennas, and these two antennas transmit the sequence A signal and the sequence B signal which are coded with DSTBC coding. As described above in the second comparative example, the sequence A signals transmitted from the base station 71 and the base station 72 are the same as each other, and the sequence B signals transmitted from the base station 71 and the base station 72 are the same as each other.

According to the system of the second comparative example, the effect of the transmission diversity can be obtained in all of the areas 81 to 83 as shown in FIG. 7, and therefore, the communication quality is improved in the entire system. However, since two base stations simultaneously transmit the same signal, there is a problem in that the effect of identical wave interference countermeasure is lost under the condition where the sequence A from the base station 71 and the sequence A from the base station 72 interfere with each other at the same power and with opposite phases, and the sequence B from the base station 71 and the sequence B from the base station 72 interfere with each other at the same power and with opposite phases. This is relatively likely to occur in a line-of-sight environment.

Hereinafter, a configuration of the second comparative example will be explained in detail.

Figure 5A:
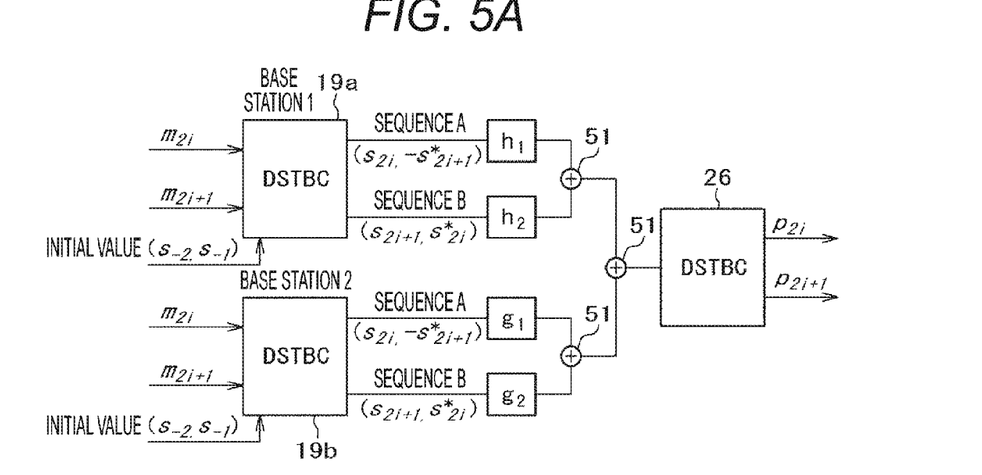
FIG. 5A is an equivalent system diagram illustrating a DSTBC transmission and reception system according to a second comparative example.

When the transmission and reception system according to the second comparative example is simplified and expressed in a block diagram, the transmission and reception system according to the second comparative example is as shown in FIG. 5A. FIG. 5A is an equivalent system diagram illustrating a DSTBC transmission and reception system according to the second comparative example. In the second comparative example, as shown in FIG. 1, the DSTBC transmitters 71a and 72a of the two base stations 71 and 72 generate two sequences, i.e., the sequence A signal and the sequence B signal, respectively, modulate the signals with a radio frequency, and transmit the modulated signals. More specifically, as shown in FIG. 5A, the DSTBC coding units 19a and 19b of the two base stations 1 and 2 generate two sequences, i.e., the sequence A signal and the sequence B signal, respectively.

At this occasion, the initial values $s_{-2}$ and $s_{-1}$ which are the same values as each other are given to the DSTBC coding units 19a and 19b. Therefore, the sequence A signals generated by the DSTBC coding unit 19a and the DSTBC coding unit 19b have the same content ($s_{2i}$, $-s^*_{2i+1}$) as each other. The sequence B signals generated by the DSTBC coding unit 19a and the DSTBC coding unit 19b have the same content ($s_{2i+1}$, $s^*_{2i}$) as each other.

In this example, the CSI of the transmission path of the sequence A signal from antenna 18a of the base station 1 to the reception antenna 21 of the receiver 20 is denoted as $h_1$. The CSI of the transmission path of the sequence B signal from antenna 18b of the base station 1 to the reception antenna 21 of the receiver 20 is denoted as $h_2$. The CSI of the transmission path of the sequence A signal from antenna 18a' of the base station 2 to the reception antenna 21 of the receiver 20 is denoted as $g_1$. The CSI of the transmission path of the sequence B signal from antenna 18b' of the base station 2 to the reception antenna 21 of the receiver 20 is denoted as $g_2$.

When the radio waves of the sequence A signal and the sequence B signal transmitted from the base stations 1 and 2, respectively, are input into the receiver 20, they are combined in terms of radio wave, and thereafter, the combined radio wave is input into the DSTBC decoding unit 26. Therefore, the input signal of the reception antenna 21, i.e., the input signal of the DSTBC decoding unit 26, at this occasion is expressed by Expression 7, i.e., Expression 8. The adder 51 as shown in FIG. 5A means "combining" in terms of radio wave.

[Mathematical Formula 7]

$$r_{2i} = h_1 s_{2i} + h_2 s_{2i+1} + g_1 s_{2i} + g_2 s_{2i+1}$$
$$r_{2i+1} = -h_1 s^*_{2i+1} + h_2 s^*_{2i} - g_1 s^*_{2i+1} + g_2 s^*_{2i}$$

(Expression 7)

[Mathematical Formula 8]

$$r_{2i} = (h_1 + g_1) s_{2i} + (h_2 + g_2) s_{2i+1}$$
$$r_{2i+1} = -(h_1 + g_1) s^*_{2i+1} + (h_2 + g_2) s^*_{2i}$$

(Expression 8)

Figure 5B:
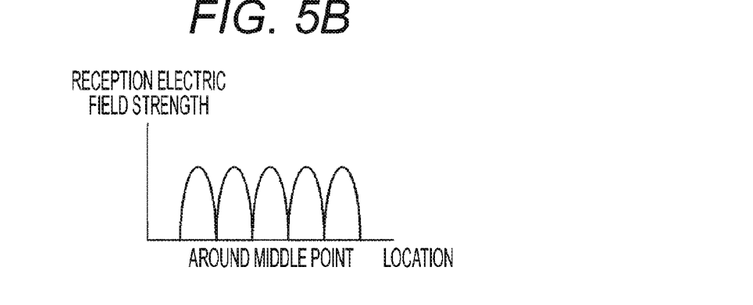
FIG. 5B is a figure illustrating average reception electric field according to the second comparative example.

FIG. 5B conceptually illustrates the average reception electric field of the receiver 20 at around the middle point between the base station 71 and the base station 72 as illustrated in the model diagram of FIG. 1 according to the second comparative example. The horizontal axis of FIG. 5B expresses a position and a range of several meters to several dozen meters at around the middle point. However, FIG. 5B shows an example of a line-of-sight environment. Therefore, FIG. 5B shows an example where $h_1$, $h_2$, $g_1$, and $g_2$ are substantially the same, i.e., a condition where $|h_1| \approx |h_2| \approx |g_1| \approx |g_2|$ is satisfied.

As is evident from Expression 8, when the condition of Expression 9 is satisfied, the receiver inputs $r_{2i}$ and $r_{2i+1}$ of Expression 7 become zero. This state is equivalent to no signal reception state, and the communication quality is degraded in the location where this state is attained. The location is a portion where the average reception electric field level drops in a periodic manner in FIG. 5B which is an image diagram.

[Mathematical Formula 9]

$$h_1 = -g_1 \text{ and } h_2 = -g_2$$

(Expression 9)

As described above, in actual fields, there is a problem in that the standing wave as shown in FIG. 5B is likely to occur along a train line in a line-of-sight environment such as plains, and countermeasures are required to cope with this problem. The present invention suggests a countermeasure to cope with this problem.

The DSTBC transmitter according to an embodiment of the present invention will be explained with reference to FIG. 6A.

Figure 6A:
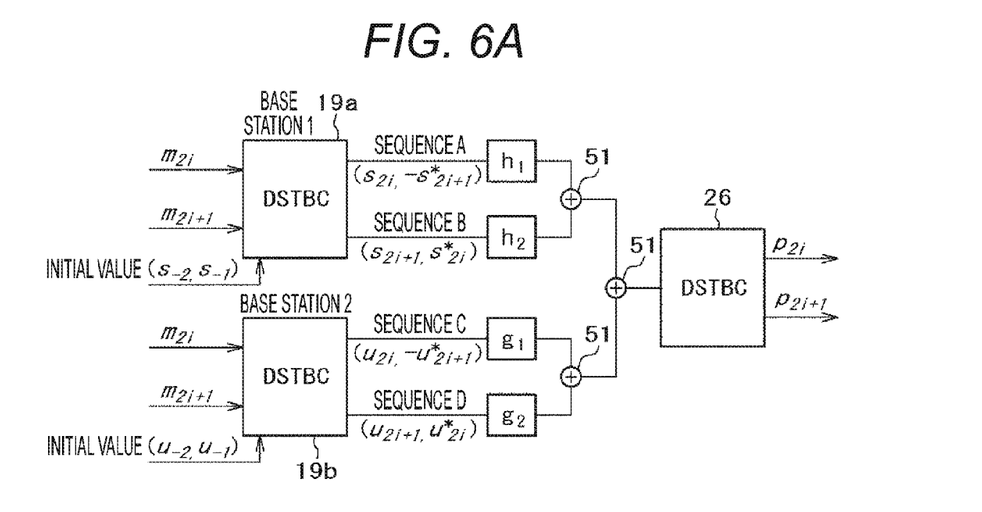
FIG. 6A is an equivalent system diagram illustrating DSTBC transmission and reception system according to an embodiment of the present invention.

FIG. 6A is an equivalent system diagram illustrating a DSTBC transmission and reception system according to an embodiment of the present invention. The difference from FIG. 5A lies in that the base station 2 outputs transmission symbols of two sequences (sequence C (A') corresponding to sequence A, and sequence D (B') corresponding to sequence B) different from transmission symbols of two sequences (sequence A and sequence B) output from the base station 1. Therefore, the effect of identical wave interference can be suppressed even at around the middle point between the base station 1 and the base station 2.

In the present embodiment, as shown in FIG. 6A, the DSTBC coding unit 19a of the base station 1 generates transmission symbols of two sequences, i.e., a sequence A signal ($s_{2i}$, $-s^*_{2i+1}$) and a sequence B signal ($s_{2i+1}$, $s^*_{2i}$). The DSTBC coding unit 19b of the base station 2 generates transmission symbols of two sequences, i.e., a sequence C signal ($u_{2i}$, $-u^*_{2i+1}$) that is different from the sequence A signal and a sequence D signal ($u_{2i+1}$, $u^*_{2i}$) that is different from the sequence B signal.

As described above, the sequence A signal, the sequence B signal, the sequence C signal, and the sequence D signal are signals that are different from each other. As described above, in a transmission unit in a stage subsequent to the DSTBC coding unit 19a (the transmission unit is not shown in FIG. 6A), the sequence A signal and the sequence B signal have an orthogonal property to each other. In a transmission unit in a stage subsequent to the DSTBC coding unit 19b (the transmission unit is not shown in FIG. 6A), the sequence C signal and the sequence D signal have an orthogonal property to each other.

In FIG. 6A, the input signals for the DSTBC coding unit 19a and the DSTBC coding unit 19b are the same input [$m_{2i}$, $m_{2i+1}$]$^T$, but the initial values $s_{-2}$, $s_{-1}$, and $u_{-2}$, $u_{-1}$, which are of values different from each other, are given to the DSTBC coding units 19a and, 19b, respectively. Accordingly, as described above, the DSTBC coding unit 19a generates the sequence A signal and the sequence B signal, and the DSTBC coding unit 19b generates the sequence C signal which is different from the sequence A signal and the sequence D signal which is different from the sequence B signal.

It should be noted that the DSTBC coding unit 19a and the DSTBC coding unit 19b have the same configuration except the given initial values, and perform the same DSTBC coding processing. Therefore, when the initial values $s_{-2}$, $s_{31\ 1}$ are given to the DSTBC coding unit 19a, the DSTBC coding unit 19a operates to generate the sequence A signal and the sequence B signal, and when the initial values $u_{-2}$, $u_{-1}$ are given to the DSTBC coding unit 19b, the DSTBC coding unit 19b operates to generate the sequence C signal and the sequence D signal.

As described above, the first initial values $s_{-2}$ and $s_{-1}$ are given to the differential time-space coding unit 19 of the transmitter 10 of the base station 1, and the differential time-space coding unit 19 receives the first and second transmission basic symbols $m_{2i}$ and $m_{2i+1}$ and performs the differential time-space coding processing, thus generating the sequence A code and the sequence B code. Then, the transmission unit 17 of the transmitter 10 of the base station 1 applies orthogonal modulation and thereafter modulates the signals with radio frequency, and outputs the signals as a sequence A transmission signal and a sequence B transmission signal.

On the other hand, the second initial values $u_{-2}$ and $u_{-1}$ which are different from the first initial values are given to the differential time-space coding unit 19 of the transmitter 10 of the base station 2, and the differential time-space coding unit 19 receives the first and second transmission basic symbols $m_{2i}$ and $m_{2i+1}$ and performs the differential time-space coding processing, thus generating the sequence C (A') code which is different from the sequence A code and the sequence D (B') code which is different from the sequence B code. Then, the transmission unit 17 of the transmitter 10 of the base station 2 applies orthogonal modulation and thereafter modulates the signals with radio frequency, and outputs the signals as the sequence C (A') transmission signal and the sequence D (B') transmission signal.

As described above, a radio communication system according to the present embodiment includes:

a first transmitter, wherein in response to a first bit string is input into the first transmitter, and a first initial value is given to the first transmitter, the first transmitter generates a sequence A transmission signal and a sequence B transmission signal orthogonal to the sequence A transmission signal, and transmits the sequence A transmission signal and the sequence B transmission signal from antennas different from each other; and a second transmitter, wherein in response to the first bit string is input into the second transmitter, and the first initial value is given to the second transmitter, the second transmitter generates the sequence A transmission signal and the sequence B transmission signal, and in response to a second initial value different from the first initial value is given to the second transmitter, the second transmitter generates a sequence C transmission signal different from the sequence A transmission signal and a sequence D transmission signal orthogonal to the sequence C transmission signal, and the second transmitter transmits the sequence C transmission signal and the sequence D transmission signal from antennas different from each other, wherein the first initial value is given to the first transmitter, and the second initial value is given to the second transmitter.

Figure 6B:
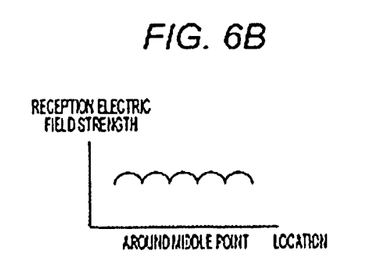
FIG. 6B is a figure illustrating average reception electric field according to an embodiment of the present invention.

FIG. 6B is a figure illustrating average reception electric field according to an embodiment of the present invention, and schematically illustrates average reception electric field of the receiver 20 at around the middle point between the base station 71 and the base station 72 in the model diagram of FIG. 1. The horizontal axis of FIG. 6B indicates a position and a range of several meters to several dozen meters at around the middle point. When the transmitter 10 according to the present embodiment is used as shown in FIG. 6B, the dropping level of the standing wave due to the identical wave interference can be suppressed even in the line-of-sight environment.

Even in an example where the DSTBC transmitter according to the present embodiment as shown in FIG. 6A is used, the configuration at the receiver side may be the configuration of the DSTBC receiver as shown in FIG. 3. In other words, the configuration at the receiver side may be the configuration of the DSTBC receiver used in the reception system of FIG. 4A and FIG. 5A.

As described above, in an example where the output signal of the DSTBC coding unit 19 generated using Expression 1 is independently received, the receiver 20 can perform decoding with Expression 3, and can restore the original signal.

Hereinafter, the following feature will be explained. For example, where the receiver 20 receives a composite wave of the output signal given by the DSTBC coding unit 19a generated using Expression 10 and the output signal given by the DSTBC coding unit 19b generated using Expression 11, the receiver can decode this composite wave according to Expression 3, and can restore the original signal, and more specifically, the original signal can be restored with the circuit configuration of the receiver 20 as shown in FIG. 3.

The output of the differential calculation unit 13 of the DSTBC coding unit 19a of the base station 1 as shown in FIG. 6A can be expressed by Expression 10 in the same manner as Expression 1.

[Mathematical Formula 10]

$$\begin{bmatrix} s_{2i} \\ s_{2i+1} \end{bmatrix} = \begin{bmatrix} s_{2i-2} & -s_{2i-1}^* \\ s_{2i-1} & s_{2i-2}^* \end{bmatrix} \begin{bmatrix} m_{2i} \\ m_{2i+1} \end{bmatrix}$$ (Expression 10)

However, the initial values $s_{-2}$ and $s_{-1}$ satisfying the condition of $|s_{-2}|^2+|s_{-1}|^2=1$ are assumed to be given to the differential calculation unit 13 of the base station 1.

On the other hand, the output given by the differential calculation unit 13 of the DSTBC coding unit 19b of the base station 2 as shown in FIG. 6A can be expressed by Expression 11.

[Mathematical Formula 11]

$$\begin{bmatrix} u_{2i} \\ u_{2i+1} \end{bmatrix} = \begin{bmatrix} u_{2i-2} & -u_{2i-1}^* \\ u_{2i-1} & u_{2i-2}^* \end{bmatrix} \begin{bmatrix} m_{2i} \\ m_{2i+1} \end{bmatrix}$$ (Expression 11)

However, the initial values $u_{-2}$ and $u_{-1}$, which are different from the initial values $s_{-2}$ and $s_{-1}$ for the base station 1 and which satisfy the condition of $|u_{-2}|^2+|u_{-1}|^2=1$, are given to the differential calculation unit 13 of the base station 2.

It is to be understood that the transmission basic symbol $[m_{2i}, m_{2i+1}]^T$ which is input into the differential calculation unit 13 of the base station 1 and the base station 2 is configured to be the same as each other. More specifically, the bit string of the same data is input into each of the transmitters 10 of the base station 1 and the base station 2 at the same point in time.

When both sides of Expression 10 are multiplied by Expression 12 from the left hand side, Expression 13 is obtained.

[Mathematical Formula 12]

$$\begin{bmatrix} s_{2i-2} & -s^*_{2i-1} \\ s_{2i-1} & s^*_{2i-2} \end{bmatrix}^{-1} \quad \text{(Expression 12)}$$

[Mathematical Formula 13]

$$\begin{bmatrix} m_{2i} \\ m_{2i+1} \end{bmatrix} = \begin{bmatrix} s_{2i-2} & -s^*_{2i-1} \\ s_{2i-1} & s^*_{2i-2} \end{bmatrix}^{-1} \begin{bmatrix} s_{2i} \\ s_{2i+1} \end{bmatrix} \quad \text{(Expression 13)}$$
$$= \frac{1}{|s_{2i-2}|^2 + |s_{2i-1}|^2} \begin{bmatrix} s^*_{2i-2} & s^*_{2i-1} \\ -s_{2i-1} & s_{2i-2} \end{bmatrix} \begin{bmatrix} s_{2i} \\ s_{2i+1} \end{bmatrix}$$
$$= \begin{bmatrix} s^*_{2i-2} & s^*_{2i-1} \\ -s_{2i-1} & s_{2i-2} \end{bmatrix} \begin{bmatrix} s_{2i} \\ s_{2i+1} \end{bmatrix}$$

When Expression 13 is substituted into Expression 11, Expression 14 is obtained.

[Mathematical Formula 14]

$$\begin{bmatrix} u_{2i} \\ u_{2i+1} \end{bmatrix} = \begin{bmatrix} u_{2i-2} & -u^*_{2i-1} \\ u_{2i-1} & u^*_{2i-2} \end{bmatrix} \begin{bmatrix} s^*_{2i-2} & s^*_{2i-1} \\ -s_{2i-1} & s_{2i-2} \end{bmatrix} \begin{bmatrix} s_{2i} \\ s_{2i+1} \end{bmatrix} \quad \text{(Expression 14)}$$

As shown in FIG. 6A, the CSI of the transmission path of the sequence A signal from antenna 18a of the base station 1 to the reception antenna 21 of the receiver 20 is denoted as $h_1$, and the CSI of the transmission path of the sequence B signal from antenna 18b of the base station 1 to the reception antenna 21 of the receiver 20 is denoted as $h_2$. The CSI of the transmission path of the sequence C signal from antenna 18a' of the base station 2 to the reception antenna 21 of the receiver 20 is denoted as $g_1$, and the CSI of the transmission path of the sequence D signal from antenna 18b' of the base station 2 to the reception antenna 21 of the receiver 20 is denoted as $g_2$.

When the radio waves of the sequence A signal, the sequence B signal, the sequence C signal, and the sequence D signal transmitted from the base stations 1 and 2 are input into the receiver 20, they are combined in terms of radio wave, and are input into the DSTBC decoding unit 26. The adder 51 as shown in FIG. 6A means "combining" in terms of radio wave. Therefore, the input signal of the reception antenna 21 at this occasion, i.e., the input signal given into the DSTBC decoding unit 26, is expressed by Expression 15.

[Mathematical Formula 15]

$$\begin{aligned} r_{2i} &= h_1 s_{2i} + h_2 s_{2i+1} + g_1 u_{2i} + g_2 u_{2i+1} \\ r_{2i+1} &= -h_1 s^*_{2i+1} + h_2 s^*_{2i} - g_1 u^*_{2i+1} + g_2 u^*_{2i} \end{aligned} \quad \text{(Expression 15)}$$

Further, when conjugates are obtained at both sides of only the second expression of Expression 15, Expression 15 can be changed into Expression 16.

[Mathematical Formula 16]

$$\begin{aligned} r_{2i} &= h_1 s_{2i} + h_2 s_{2i+1} + g_1 u_{2i} + g_2 u_{2i+1} \\ r^*_{2i+1} &= -h^*_1 s_{2i+1} + h^*_2 s_{2i} - g^*_1 u_{2i+1} + g^*_2 u_{2i} \end{aligned} \quad \text{(Expression 16)}$$

When Expression 16 is expressed as a matrix, Expression 17 is obtained.

[Mathematical Formula 17]

$$\begin{bmatrix} r_{2i} \\ r^*_{2i+1} \end{bmatrix} = \begin{bmatrix} h_1 & h_2 \\ h^*_2 & -h^*_1 \end{bmatrix} \begin{bmatrix} s_{2i} \\ s_{2i+1} \end{bmatrix} + \begin{bmatrix} g_1 & g_2 \\ g^*_2 & -g^*_1 \end{bmatrix} \begin{bmatrix} u_{2i} \\ u_{2i+1} \end{bmatrix} \quad \text{(Expression 17)}$$

When Expression 14 is substituted into Expression 17, Expression 18 is obtained.

[Mathematical Formula 18]

$$\begin{aligned} \begin{bmatrix} r_{2i} \\ r^*_{2i+1} \end{bmatrix} &= \begin{bmatrix} h_1 & h_2 \\ h^*_2 & -h^*_1 \end{bmatrix} \begin{bmatrix} s_{2i} \\ s_{2i+1} \end{bmatrix} + \begin{bmatrix} g_1 & g_2 \\ g^*_2 & -g^*_1 \end{bmatrix} \begin{bmatrix} u_{2i-2} & -u^*_{2i-1} \\ u_{2i-1} & u^*_{2i-2} \end{bmatrix} \begin{bmatrix} s^*_{2i-2} & s^*_{2i-1} \\ -s_{2i-1} & s_{2i-2} \end{bmatrix} \begin{bmatrix} s_{2i} \\ s_{2i+1} \end{bmatrix} \\ &= \begin{bmatrix} h_1 & h_2 \\ h^*_2 & -h^*_1 \end{bmatrix} \begin{bmatrix} s_{2i} \\ s_{2i+1} \end{bmatrix} + \begin{bmatrix} g_1 & g_2 \\ g^*_2 & -g^*_1 \end{bmatrix} \begin{bmatrix} u_{2i-2} s^*_{2i-2} + u^*_{2i-1} s_{2i-1} & u_{2i-2} s^*_{2i-1} - u^*_{2i-1} s_{2i-2} \\ -u^*_{2i-2} s_{2i-1} + u_{2i-1} s^*_{2i-2} & u^*_{2i-2} s_{2i-2} + u_{2i-1} s^*_{2i-1} \end{bmatrix} \begin{bmatrix} s_{2i} \\ s_{2i+1} \end{bmatrix} \\ &= \begin{bmatrix} h_1 & h_2 \\ h^*_2 & -h^*_1 \end{bmatrix} \begin{bmatrix} s_{2i} \\ s_{2i+1} \end{bmatrix} + \begin{bmatrix} g_1 & g_2 \\ g^*_2 & -g^*_1 \end{bmatrix} \begin{bmatrix} z_1 & z_2 \\ -z^*_2 & z^*_1 \end{bmatrix} \begin{bmatrix} s_{2i} \\ s_{2i+1} \end{bmatrix} \end{aligned} \quad \text{(Expression 18)}$$

z1 and z2 as shown in Expression 18 are as expressed by Expression 19 and Expression 20, respectively.

[Mathematical Formula 19]

$$z_1 = u_{2i-2} s^*_{2i-2} + u^*_{2i-1} s_{2i-1} \quad \text{(Expression 19)}$$

[Mathematical Formula 20]

$$z_2 = u_{2i-2} s^*_{2i-1} - u^*_{2i-1} s_{2i-2} \quad \text{(Expression 20)}$$

When the right hand side of Expression 19 is expressed by an expression after two symbol transmission times, and further, Expression 10 and Expression 11 are substituted therein, Expression 21 is obtained.

[Mathematical Formula 21]

$$u_{2i}s_{2i}^* + u_{2i+1}^*s_{2i+1} = (u_{2i-1}m_{2i} - u_{2i-1}^*m_{2i+1})(s_{2i-2}^*m_{2i}^* - s_{2i-1}m_{2i+1}^*) +$$
$$(u_{2i-1}^*m_{2i}^* + u_{2i-2}m_{2i+1})(s_{2i-1}m_{2i} + s_{2i-2}^*m_{2i+1})$$
$$= u_{2i-2}s_{2i-2}^*|m_{2i}|^2 - u_{2i-2}m_{2i}s_{2i-1}m_{2i+1} - u_{2i-1}m_{2i+1}s_{2i-2}^*m_{2i}^* + u_{2i-1}^*s_{2i-1}|m_{2i+1}|^2 +$$
$$u_{2i-1}^*s_{2i-1}|m_{2i}|^* + u_{2i-1}^*m_{2i}^*s_{2i-2}^*m_{2i+1} + u_{2i-2}m_{2i+1}^*s_{2i-1}m_{2i} + u_{2i-2}s_{2i-2}^*|m_{2i+1}|^2$$
$$= (u_{2i-2}s_{2i-2}^* + u_{2i-1}^*s_{2i-1})(|m_{2i}|^2 + |m_{2i+1}|^2)$$
$$= u_{2i-2}s_{2i-2}^* + u_{2i-1}^*s_{2i-1}$$
$$\vdots$$
$$= u_{-2}s_{-2}^* + u_{-1}^*s_{-1}$$
$$= z_1$$

(Expression 21)

It is understood from Expression 21 that Expression 19 stays the same even with a shift of two symbol transmission times. Therefore, $z_1 = u_{-2}s_{-2}^* + u_{-1}^*s_{-1}$ is obtained.

Likewise, when the right hand side of Expression 20 is also expressed by an expression after two symbol transmission times, and further, Expression 10 and Expression 11 are substituted therein and the expression is rearranged, then, $z_2 = u_{-2}s_{-1}^* - u_{-1}^*s_{-2}$ is obtained.

Therefore, it is understood that $z_1$, $z_2$ of Expression 19 and Expression 20 are fixed values. More specifically, it is understood that $z_1$ and $z_2$ are fixed value (complex numbers) that are determined by the initial values $s_{-2}$, $s_{-1}$, $u_{-2}$, and $u_{-1}$ when the initial values $s_{-2}$, $s_{-1}$, $u_{-2}$, and $u_{-1}$ are determined.

When Expression 18 is further expanded, Expression 22 is obtained.

[Mathematical Formula 22]

$$\begin{bmatrix} r_{2i} \\ r_{2i+1}^* \end{bmatrix} = \begin{bmatrix} h_1 & h_2 \\ h_2^* & -h_1^* \end{bmatrix}\begin{bmatrix} s_{2i} \\ s_{2i+1} \end{bmatrix} + \begin{bmatrix} g_1 & g_2 \\ g_2^* & -g_1^* \end{bmatrix}\begin{bmatrix} z_1 & z_{2i} \\ -z_2^* & z_1^* \end{bmatrix}\begin{bmatrix} s_{2i} \\ s_{2i+1} \end{bmatrix}$$
$$= \begin{bmatrix} h_1 & h_2 \\ h_2^* & -h_1^* \end{bmatrix}\begin{bmatrix} s_{2i} \\ s_{2i+1} \end{bmatrix} + \begin{bmatrix} g_1z_1 - g_2z_2^* & g_1z_2 + g_2z_1^* \\ g_1^*z_2^* + g_2^*z_1 & -(g_1^*z_1^* + g_2^*z_2) \end{bmatrix}\begin{bmatrix} s_{2i} \\ s_{2i+1} \end{bmatrix}$$
$$= \begin{bmatrix} h_1 + g_1z_1 - g_2z_2^* & h_2 + g_1z_2 + g_2z_1^* \\ (h_2 + g_1z_2 + g_2z_1^*)^* & -(h_1 + g_1z_1 - g_2z_2^*)^* \end{bmatrix}\begin{bmatrix} s_{2i} \\ s_{2i+1} \end{bmatrix}$$
$$= \begin{bmatrix} k_1 & k_2 \\ k_2^* & -k_1^* \end{bmatrix}\begin{bmatrix} s_{2i} \\ s_{2i+1} \end{bmatrix}$$
$$= K\begin{bmatrix} s_{2i} \\ s_{2i+1} \end{bmatrix}$$

(Expression 22)

[Mathematical Formula 23]

$$k_1 = h_1 + g_1z_1 - g_2z_2^*$$
$$k_2 = h_2 + g_1z_2 + g_2z_1^*$$
$$K = \begin{bmatrix} k_1 & k_2 \\ k_2^* & -k_1^* \end{bmatrix}$$

(Expression 23)

When both sides of Expression 22 are multiplied by $K^{-1}$ from the left hand side, Expression 24 is obtained.

[Mathematical Formula 24]

$$\begin{bmatrix} s_{2i} \\ s_{2i+1} \end{bmatrix} = K^{-1}\begin{bmatrix} r_{2i} \\ r_{2i+1}^* \end{bmatrix}$$

(Expression 24)

In this example where the change of the CSI over time is sufficiently low with respect to the symbol rate, then, $z_1$ and $z_2$ are fixed values as described above, and therefore, Expression 23 can be deemed not to change over time. Therefore, Expression 24 can be applied to two symbol transmission times before, and in that case, Expression 24 becomes Expression 25.

[Mathematical Formula 25]

$$\begin{bmatrix} s_{2i-2} \\ s_{2i-1} \end{bmatrix} = K^{-1}\begin{bmatrix} r_{2i-2} \\ r_{2i-1}^* \end{bmatrix}$$

(Expression 25)

When the Hermitian transpose H of Expression 25 is derived, Expression 26 is obtained.

[Mathematical Formula 26]

$$[s_{2i-2}^* \; s_{2i-1}^*] = [r_{2i-2}^* \; r_{2i-1}][K^{-1}]^H$$

(Expression 26)

When both sides of Expression 24 are multiplied by both sides of Expression 26 (Expression 24 is multiplied by Expression 26 from the left hand side), then Expression 27 is obtained.

[Mathematical Formula 27]

$$[s_{2i-2}^* \; s_{2i-1}^*]\begin{bmatrix} s_{2i} \\ s_{2i+1} \end{bmatrix} = [r_{2i-2}^* \; r_{2i-1}][K^{-1}]^H K^{-1}\begin{bmatrix} r_{2i} \\ r_{2i+1}^* \end{bmatrix}$$

(Expression 27)

In view of Expression 13, the left hand side of Expression 27 is $m_{2i}$.

$[K^{-1}]^H K^{-1}$ which is a part of Expression 27 is made into Expression 28.

[Mathematical Formula 28]

$$[K^{-1}]^H K^{-1} = \left(\frac{-1}{|k_1|^2+|k_2|^2}\right)^2 \begin{bmatrix} -k_1 & -k_2 \\ -k_2^* & k_1^* \end{bmatrix}\begin{bmatrix} -k_1^* & -k_2 \\ -k_2^* & k_1 \end{bmatrix}$$

$$= \frac{1}{|k_1|^2+|k_2|^2}\begin{bmatrix} 1 & 0 \\ 0 & 1 \end{bmatrix}$$

(Expression 28)

Therefore, $m_{2i}$ which is the left hand side of the Expression 27 is made into Expression 29.

[Mathematical Formula 29]

$$m_{2i} = \frac{1}{|k_1|^2+|k_2|^2}[r_{2i-2}^* \; r_{2i-1}]\begin{bmatrix} r_{2i} \\ r_{2i+1}^* \end{bmatrix}$$

(Expression 29)

Subsequently, when the vectors of Expression 25 are rotated by multiplying Expression 25 by Expression 30 from the left hand side, then, Expression 31 is obtained.

[Mathematical Formula 30]

$$\begin{bmatrix} 0 & -1 \\ 1 & 0 \end{bmatrix}$$

(Expression 30)

[Mathematical Formula 31]

$$\begin{bmatrix} 0 & -1 \\ 1 & 0 \end{bmatrix}\begin{bmatrix} s_{2i-2} \\ s_{2i-1} \end{bmatrix} = \begin{bmatrix} 0 & -1 \\ 1 & 0 \end{bmatrix}K^{-1}\begin{bmatrix} r_{2i-2} \\ r_{2i-1}^* \end{bmatrix}$$

$$\begin{bmatrix} -s_{2i-1} \\ s_{2i-1} \end{bmatrix} = \frac{-1}{|k_1|^2+|k_2|^2}\begin{bmatrix} k_2^* & -k_1 \\ -k_1^* & -k_2 \end{bmatrix}\begin{bmatrix} r_{2i-2} \\ r_{2i-1}^* \end{bmatrix}$$

(Expression 31)

When the transposition T of Expression 31 is derived, Expression 32 is obtained.

[Mathematical Formula 32]

$$[-s_{2i-1} \; s_{2i-2}] = \frac{-1}{|k_1|^2+|k_2|^2}[r_{2i-2} \; r_{2i-1}^*]\begin{bmatrix} k_2^* & -k_1^* \\ -k_1 & -k_2 \end{bmatrix}$$

(Expression 32)

When both sides of Expression 24 are multiplied by both sides of Expression 32 (Expression 24 is multiplied by Expression 32 from the left hand side), Expression 33 is obtained.

[Mathematical Formula 33]

$$[-s_{2i-1} \; s_{2i-2}]\begin{bmatrix} s_{2i} \\ s_{2i+1} \end{bmatrix} =$$

$$\frac{-1}{|k_1|^2+|k_2|^2}[r_{2i-2} \; r_{2i-1}^*]\begin{bmatrix} k_2^* & -k_1^* \\ -k_1 & -k_2 \end{bmatrix}K^{-1}\begin{bmatrix} r_{2i} \\ r_{2i+1}^* \end{bmatrix}$$

(Expression 33)

In view of Expression 13, the left hand side of Expression 33 is $m_{2i+1}$.

Expression 34 which is a part of the right hand side of Expression 33 is made into Expression 35.

[Mathematical Formula 34]

$$\begin{bmatrix} k_2^* & -k_1^* \\ -k_1 & -k_2 \end{bmatrix}K^{-1}$$

(Expression 34)

[Mathematical Formula 35]

$$\begin{bmatrix} k_2^* & -k_1^* \\ -k_1 & -k_2 \end{bmatrix}K^{-1} = \left(\frac{-1}{|k_1|^2+|k_2|^2}\right)\begin{bmatrix} k_2^* & -k_1^* \\ -k_1 & -k_2 \end{bmatrix}\begin{bmatrix} -k_1^* & -k_2 \\ -k_2^* & k_1 \end{bmatrix}$$

$$= (-1)\begin{bmatrix} 0 & -1 \\ 1 & 0 \end{bmatrix}$$

(Expression 35)

Therefore, the right hand side of Expression 33 is made into Expression 36.

[Mathematical Formula 36]

$$\frac{-1}{|k_1|^2+|k_2|^2}[r_{2i-2} \; r_{2i-1}^*]\begin{bmatrix} k_2^* & -k_1^* \\ -k_1 & -k_2 \end{bmatrix}K^{-1}\begin{bmatrix} r_{2i} \\ r_{2i+1}^* \end{bmatrix} = \frac{1}{|k_1|^2+|k_2|^2}[r_{2i-1} \; r_{2i-1}^*]\begin{bmatrix} 0 & -1 \\ 1 & 0 \end{bmatrix}\begin{bmatrix} r_{2i} \\ r_{2i+1}^* \end{bmatrix}$$

$$= \frac{1}{|k_1|^2+|k_2|^2}[r_{2i-1}^* \; -r_{2i-2}]\begin{bmatrix} r_{2i} \\ r_{2i+1}^* \end{bmatrix}$$

(Expression 36)

Therefore, $m_{2i+1}$ which is the left hand side of Expression 33 is made into Expression 37.

[Mathematical Formula 37]

$$m_{2i+1} = \frac{1}{|k_1|^2 + |k_2|^2} [r_{2i-1}^* \ -r_{2i-2}] \begin{bmatrix} r_{2i} \\ r_{2i+1}^* \end{bmatrix} \quad \text{(Expression 37)}$$

When Expression 29 and Expression 37 are expressed as a matrix, Expression 38 is obtained.

[Mathematical Formula 38]

$$\begin{bmatrix} m_{2i} \\ m_{2i+1} \end{bmatrix} = \frac{1}{|k_1|^2 + |k_2|^2} \begin{bmatrix} r_{2i-2}^* & r_{2i-1} \\ r_{2i-1}^* & -r_{2i-2} \end{bmatrix} \begin{bmatrix} r_{2i} \\ r_{2i+1}^* \end{bmatrix} \quad \text{(Expression 38)}$$

In this case, when Expression 22 is rearranged, Expression 39 is obtained.

[Mathematical Formula 39]

$$|k_1|^2 + |k_2|^2 = |r_{2i-2}|^2 + |r_{2i-1}|^2 \quad \text{(Expression 39)}$$

Deriving Expression 39 will be explained.

When Expression 22 that has been explained above is applied to a period of time before, Expression 22a is obtained.

[Mathematical Formula 22c]

$$\begin{bmatrix} r_{2i} \\ r_{2i+1}^* \end{bmatrix} = K \begin{bmatrix} s_{2i} \\ s_{2i+1} \end{bmatrix} \quad \text{(Expression 22)}$$

[Mathematical Formula 22a]

$$\begin{bmatrix} r_{2i-2} \\ r_{2i-1}^* \end{bmatrix} = K \begin{bmatrix} s_{2i-2} \\ s_{2i-1} \end{bmatrix} \quad \text{(Expression 22a)}$$

When the Hermitian transposes H of both sides of Expression 22a are derived, Expression 22b is obtained.

[Mathematical Formula 22b]

$$\begin{bmatrix} r_{2i-2} \\ r_{2i-1}^* \end{bmatrix}^H = \left( K \begin{bmatrix} s_{2i-2} \\ s_{2i-1} \end{bmatrix} \right)^H \quad \text{(Expression 22b)}$$

$$[r_{2i-2}^* \ r_{2i-1}] = [s_{2i-2}^* \ s_{2i-1}^*] K^H$$

The right hand side of Expression 22a is multiplied by the right hand side of Expression 22b, and the left hand side of Expression 22a is multiplied by the left hand side of Expression 22b (Expression 22a is multiplied by Expression 22b from the left hand side), then, Expression 39 is obtained.

[Mathematical Formula 39a]

$$[r_{2i-2}^* \ r_{2i-1}] \begin{bmatrix} r_{2i-2} \\ r_{2i-1}^* \end{bmatrix} = [s_{2i-2}^* \ s_{2i-1}^*] K^H K \begin{bmatrix} s_{2i-2} \\ s_{2i-1} \end{bmatrix}$$

$$|r_{2i-2}|^2 + |r_{2i-1}|^2 = [s_{2i-2}^* \ s_{2i-1}^*] \begin{bmatrix} k_1^* & k_2 \\ k_2^* & -k_1 \end{bmatrix} \begin{bmatrix} k_1 & k_2 \\ k_2^* & -k_1^* \end{bmatrix} \begin{bmatrix} s_{2i-2} \\ s_{2i-1} \end{bmatrix}$$

$$|r_{2i-2}|^2 + |r_{2i-1}|^2 = [s_{2i-2}^* \ s_{2i-1}^*] \begin{bmatrix} |k_1|^2 + |k_2|^2 & 0 \\ 0 & |k_1|^2 + |k_2|^2 \end{bmatrix} \begin{bmatrix} s_{2i-2} \\ s_{2i-1} \end{bmatrix}$$

$$|r_{2i-2}|^2 + |r_{2i-1}|^2 = (|k_1|^2 + |k_2|^2)[s_{i2-2}^* \ s_{2i-1}^*] \begin{bmatrix} s_{2i-2} \\ s_{2i-1} \end{bmatrix}$$

$$|r_{2i-2}|^2 + |r_{2i-1}|^2 = (|k_1|^2 + |k_2|^2)(|s_{2i-2}|^2 + |s_{2-i1}|^2)$$

$$|r_{2i-2}|^2 + |r_{2i-1}|^2 = |k_1|^2 + |k_2|^2$$

$$(\text{from } |s_{2i-2}|^2 + |s_{2i-1}|^2 = 1)$$

Therefore, Expression 38 is made into Expression 40.

[Mathematical Formula 40]

$$\begin{bmatrix} m_{2i} \\ m_{2i+1} \end{bmatrix} = \frac{1}{|r_{2i-2}|^2 + |r_{2i-1}|^2} \begin{bmatrix} r_{2i-2}^* & r_{2i-1} \\ r_{2i-}^* & -r_{2i-2} \end{bmatrix} \begin{bmatrix} r_{2i} \\ r_{2i+1}^* \end{bmatrix} \quad \text{(Expression 40)}$$

The right hand side of Expression 40 is the same as the right hand side of Expression 3. Therefore, $m_{2i}$ and $m_{2i+1}$, which are at the left hand side of Expression 40 are the same as $p_{2i}$ and $p_{2i+1}$, respectively, which are at the left hand side of Expression 3. This means that the DSTBC receiver of FIG. 6A can be realized with the same configuration as the DSTBC receiver of FIG. 4A, i.e., the same configuration as the DSTBC receiver of FIG. 3.

In the present embodiment, at least the following effects can be obtained.

(1) Each of the transmitters of the two base stations adjacent to each other are provided with the DSTBC coding unit that performs the same DSTBC coding processing, and the DSTBC coding units of the two base stations receive the same transmission basic symbol based on the same digital bit string to be transmitted, and the initial values given to the DSTBC coding units of the two base stations are configured to be different from each other. According to this configuration, in the areas other than the interference area of the two base station radio waves, the degradation of the communication quality can be alleviated, and in the interference area of the two base station radio waves, the effect of the identical wave interference can be alleviated.

(2) Since the transmitter is configured as described in (1), the receiver of the present embodiment can be configured with the same configuration as that of the receiver described in the background art. More specifically, the receiver described in the background art can also be used, as it is, for the receiver according to the present embodiment.

The present invention is not limited to the embodiment that has been explained above, and can be changed into various manners within the gist of the present invention, and the constituent elements of the embodiment that has been explained above may be combined as necessary in any manner and appropriately.

For example, in the embodiment that has been explained above, the four value digital modulation (2 bits/1 symbol) generating a single transmission symbol based on two digital bits which are to be transmitted has been explained as an example, but a configuration for generating a single transmission symbol based on three or more digital bits may be employed.

In the embodiment that has been explained above, the DSTBC transmitters are provided in base stations adjacent to each other in the train radio system, but the application of the present invention is not limited to the train radio system. The application of the present invention is not limited to the transmitter of the base station either.

The present invention may be understood as not only the system for executing the processing according to the present invention but also as an apparatus, a method, or a program for realizing the method or the system, or a non-transitory computer readable recording medium for recording the program.

The present invention may be a configuration that is controlled when a CPU executes a control program stored in a memory, or may be configured as a hardware circuit.

REFERENCE SIGNS LIST 10 transmitter
11 S/P conversion unit
12, 12a, 12b symbol mapping unit
13 differential calculation unit
14 delay unit
15 time-space coding unit (STBC coding unit)
16 storage unit
17, 17a, 17b transmission unit
18, 18a, 18b transmission antenna
19 differential time-space coding unit (DSTBC coding unit)
20 receiver
21 reception antenna
22 reception unit
23 S/P conversion unit
24 differential calculation unit
25 delay unit
26 differential time-space decoding unit (DSTBC decoding unit)
27 symbol detection unit
31 adder
51 adder
61, 62 base station
63 vehicle station
63a receiver
64 dispatch console
65 central apparatus
66 circuit
71, 72 base station
71a, 72a transmitter.

What is claimed is:

1. A radio communication system, comprising:
a first transmitter;
a second transmitter; and
a receiver;
wherein the first transmitter includes:
a first symbol mapping unit that outputs a first and second transmission basic symbols by performing symbol modulation on a first bit string,
a first differential time-space coding unit that receives a first initial value, receives the first and second transmission basic symbols, performs differential time-space coding processing, and generating a sequence A code and a sequence B code,
a first transmission unit that modulates the sequence A code and the sequence B code with a radio frequency, and outputs the sequence A code and the sequence B code as a sequence A transmission signal and a sequence B transmission signal, respectively,
a first antenna that outputs the sequence A transmission signal with a first radio signal, and
a second antenna that outputs the sequence B transmission signal with a second radio signal;
wherein the second transmitter includes:
a second symbol mapping unit that outputs a third and fourth transmission basic symbols by performing symbol modulation on a second bit string,
a second differential time-space coding unit that receives a second initial value different from the first initial value, receives the third and fourth transmission basic symbols, performs the differential time-space coding processing, and generates a sequence C code which is different from the sequence A code and a sequence D code which is different from the sequence B code,
a second transmission unit that modulates the sequence C code and the sequence D code with a second radio frequency, and outputs the sequence C code and the sequence D code as a sequence C transmission signal and a sequence D transmission signal,
a third antenna that outputs the sequence C transmission signal with a third radio signal, and
a fourth antenna that outputs the sequence D transmission signal with a fourth radio signal; and
wherein the receiver includes:
a reception unit that receives and demodulates the sequence A transmission signal, the sequence B transmission signal, the sequence C transmission signal, and the sequence D transmission signal,
a differential time-space decoding unit that performs differential time-space decoding processing of an output signal given from the reception unit, and
a symbol detection unit that restores the first bit string on the basis of the output signal given from the differential time-space decoding unit.

2. The radio communication system according to claim 1, wherein the first differential time-space coding unit includes a first differential calculation unit and a first time-space coding unit, and the second differential time-space coding unit includes a second differential calculation unit and a second time-space coding unit,
wherein the first and second differential calculation units perform differential calculation by using Expression 1 wherein outputs of the first and second differential calculation units are denoted as $s_{2i}$, and $s_{2i+1}$, and the first and second transmission basic symbols are denoted as $m_{2i}$, and $m_{2i+1}$, respectively, wherein the first and second time-space coding units receive outputs $s_{2i}$ and $s_{2i+1}$, respectively, from the first and second differential calculation units, output $s_{2i}$ and $-s^*_{2i+1}$ as the sequence A code and the sequence C code, respectively, and output $s_{2i+1}$ and $s^*_{2i}$ as the sequence B code and the sequence D code, and wherein the Expression 1 includes:

[Mathematical Formula 1]

$$\begin{bmatrix} s_{2i} \\ s_{2i+1} \end{bmatrix} = \begin{bmatrix} s_{2i-2} & -s^*_{2i-1} \\ s_{2i-1} & s^*_{2i-2} \end{bmatrix} \begin{bmatrix} m_{2i} \\ m_{2i+1} \end{bmatrix}.$$ (Expression 1)

3. The radio communication system according to claim 1, wherein the first transmitter and the second transmitter are provided in a line-of-sight environment.

4. The radio communication system according to claim 1, wherein the first transmitter is provided in a first base station, and the second transmitter is provided in a second base station, and wherein the receiver receiving signals from the first transmitter and the second transmitter is provided in a vehicle station.

5. The radio communication system according to claim 2, wherein the first transmitter and the second transmitter are provided in line-of-sight environment.

6. The radio communication system according to claim 2, wherein the first transmitter is provided in a first base station, and the second transmitter is provided in a second base station, and wherein the receiver receiving signals from the first transmitter and the second transmitter is provided in a vehicle station.

7. The radio communication system according to claim 3, wherein the first transmitter is provided in a first base station, wherein the second transmitter is provided in a second base station, and wherein the receiver receiving signals from the first transmitter and the second transmitter is provided in a vehicle station.

8. A radio communication system, comprising:
a first transmitter that includes:
a first differential time-space coding unit that receives a first bit string and a first initial value and generates a sequence A transmission signal and a sequence B transmission signal that is orthogonal to the sequence A transmission signal,
a first antenna that transmits the sequence A transmission signal with a first radio signal, and
a second antenna that transmits the sequence B transmission signal with a second radio signal; and
a second transmitter that includes:
a second differential time-space coding unit that receives the first bit string and either the first initial value or a second initial value, the second initial value being different from the first initial value,
wherein, in response to receiving the first bit string and the first initial value, the second differential time-space coding unit generates a second sequence A transmission signal and a second sequence B transmission signal, and transmits the second sequence A transmission signal and the second sequence B transmission signal from the first and second antennas, respectively, and
wherein in response to receiving the first bit string and the second initial value the second differential time-space coding unit generates a sequence C transmission signal different from the sequence A transmission signal and a sequence D transmission signal that is orthogonal to the sequence C transmission signal,
a third antenna that transmits the sequence C transmission signal with a third radio signal, and
a fourth antenna that transmits the sequence D transmission signal with a fourth radio signal.

9. The radio communication system according to claim 8, further comprising a receiver that includes:
a reception unit that receives and demodulates the sequence A transmission signal, the sequence B transmission signal, the sequence C transmission signal, and the sequence D transmission signal.

10. The radio communication system according to claim 9, wherein the receiver further includes:
a differential time-space decoding unit that performs differential time-space decoding processing of an output signal given from the reception unit.

11. The radio communication system according to claim 10, wherein the receiver further includes:
a symbol detection unit that restores the first bit string on a basis of an output signal given from the differential time-space decoding unit.

* * * * *